J. B. HOAG.
Horse Rake.
No. 67,054.
Patented July 23, 1867.
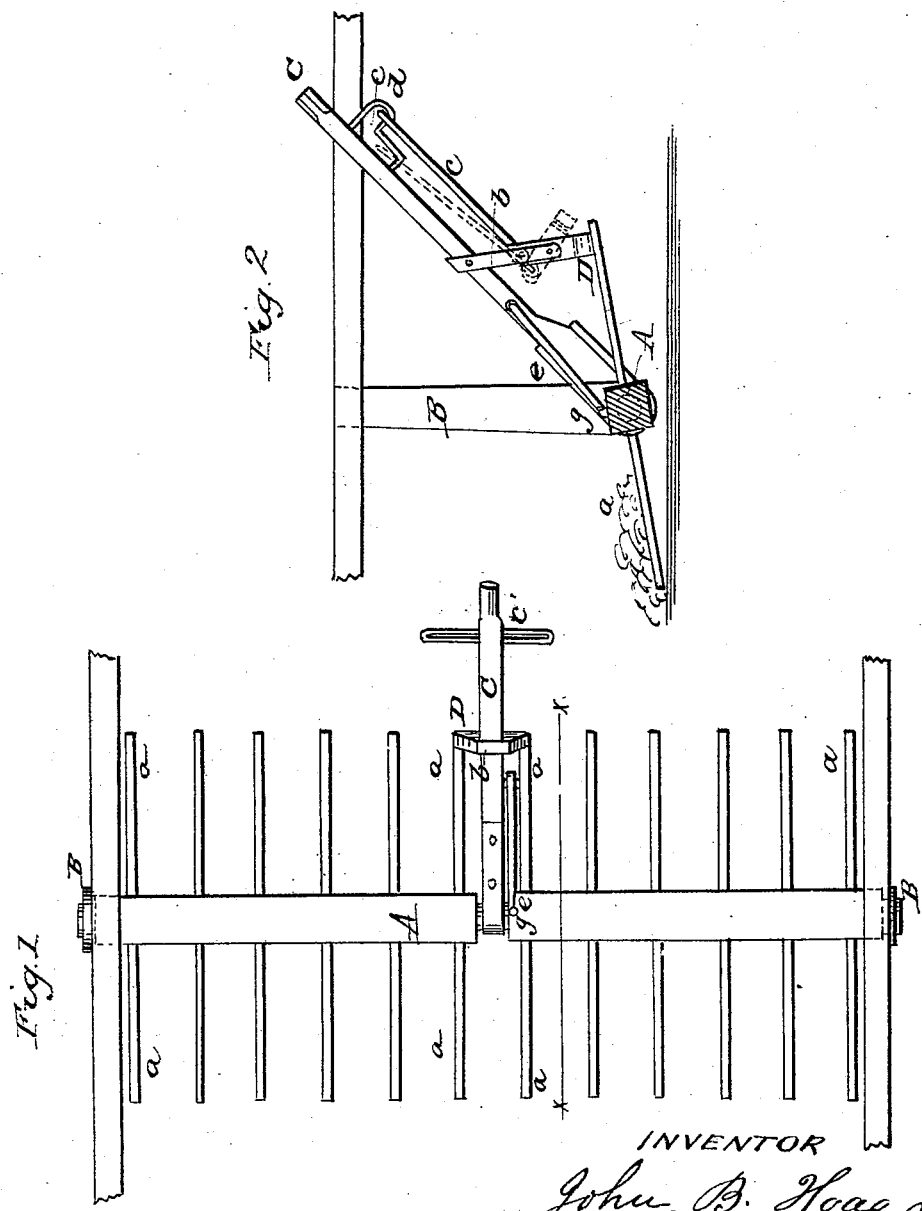

United States Patent Office

JOHN B. HOAG, OF OXFORD, ILLINOIS.

Letters Patent No. 67,054, dated July 23, 1867.

---

IMPROVEMENT IN HORSE-RAKES.

---

*The Schedule referred to in these Letters Patent and making part of the same.*

---

TO ALL WHOM IT MAY CONCERN:

Be it known that I, JOHN B. HOAG, of Oxford, in the county of Henry, and State of Illinois, have invented a new and useful Improvement in Horse-Rakes; and I do hereby declare that the following is a full, clear, and exact description thereof, which will enable others skilled in the art to make and use the same, reference being had to the accompanying drawings, forming a part of this specification, in which—

Figure 1 is a top view of a revolving horse-rake, with my improved device attached, for operating.

Figure 2 is a side sectional view, showing the same, taken in the line $x\ x$, fig. 1.

Similar letters of reference indicate like parts.

This invention relates to a new and useful device for holding a horse-rake when working, and releasing it when loaded, to enable it to revolve and dump the hay, and it consists in a lock-block suspended to a handle in the rear of the machine, which holds the teeth down when raking, and is operated on with a sliding-rod by the driver in such manner as to release the block instantly when the rake is full, to allow it to turn and discharge the hay. As soon as the rake revolves the block takes its position on the teeth again, and, together with a catch on the rake-head, holds the rake-teeth down to the surface until they are again loaded.

A is the rake-head provided with teeth $a\ a$ on opposite sides, in the usual way, and suspended by side pieces B B to a suitable frame for draught by a horse. The rake-head is swivelled on the end of a handle, C, that rises at an angle behind the machine for the driver to operate it with. A lock-block, D, is suspended to a yoke, $b$, fastened on the handle C, and is connected at the upper end with a rod, $c$, that is slotted at its outer end, to slide within and upon a staple, $d$, under the handle, so that the driver can operate the lock-block D, and release it as desired. The lock-block is made wide enough at the lower end to rest upon two middle teeth and hold the rake in position for working, and is made tapering and narrow at the upper end so as to move back and forth in the yoke $b$, and thus when the slide-rod $c$ is pushed back by its handle, $c'$, to release the teeth and allow the rake to revolve, as shown clearly in fig. 2. On the side of the handle C is pivoted a rod, $e$, the end of which catches against a pin, $g$, on the rake-head A, when it turns over and holds it fast. It will be seen that the staple $d$ is made with a drop at the upper end for receiving the handle $c'$ of the handle C, for the purpose of holding the lock-block D on the rake-teeth, when at work, and that the handle $c'$ is lifted out of the drop in the staple to push the slide-rod $c$ forward for releasing the block from the teeth, to let the rake turn over and discharge its load.

Having thus described my invention, I claim as new, and desire to secure by Letters Patent—

The sliding-rod $c$, in combination with the staple $d$ in the handle C, the lock-block D and catch-rod $e$, arranged and operating substantially as and for the purposes herein described.

JOHN B. HOAG.

Witnesses:
 URI DAVID,
 FRANKLIN THORNTON,
 P. L. DAVID.